(12) United States Patent
Wu et al.

(10) Patent No.: US 12,062,508 B2
(45) Date of Patent: Aug. 13, 2024

(54) ELECTROMAGNET DRIVING MECHANISM, ASSEMBLY AND DUAL POWER AUTOMATIC TRANSFER SWITCH

(71) Applicant: Schneider Electric Industries SAS, Rueil-Malmaison (FR)

(72) Inventors: Jian Wu, Shanghai (CN); Zhenzhong Liu, Shanghai (CN); Shunxian Mao, Shanghai (CN); Gang Yu, Shanghai (CN)

(73) Assignee: Schneider Electric Industries SAS, Rueil-Malmaison (FR)

( * ) Notice: Subject to any disclaimer, the term of this patent is extended or adjusted under 35 U.S.C. 154(b) by 30 days.

(21) Appl. No.: 18/091,488

(22) Filed: Dec. 30, 2022

(65) Prior Publication Data
US 2023/0215666 A1    Jul. 6, 2023

(30) Foreign Application Priority Data
Dec. 30, 2021    (CN) .......................... 202123446259.3

(51) Int. Cl.
*H01H 3/28* (2006.01)
*H02J 9/06* (2006.01)

(52) U.S. Cl.
CPC ............... *H01H 3/28* (2013.01); *H02J 9/061* (2013.01); *H01H 2300/018* (2013.01)

(58) Field of Classification Search
CPC ....................................................... H01H 3/28
USPC ........................................................ 307/64
See application file for complete search history.

(56) References Cited

U.S. PATENT DOCUMENTS

| 10,825,625 | B1* | 11/2020 | Marshall | ............ H01H 33/6662 |
| 2015/0022297 | A1* | 1/2015 | Kim | ....................... H01F 7/1646 |
| | | | | 335/203 |
| 2015/0042426 | A1* | 2/2015 | Ignatov | .................... H01H 3/28 |
| | | | | 335/193 |

FOREIGN PATENT DOCUMENTS

| CN | 208271761 U | 12/2018 |
| CN | 109859965 B | 9/2020 |

OTHER PUBLICATIONS

Examination Report dated Jan. 9, 2024 for corresponding Indian Patent Application No. 202244076310, 7 pages.

* cited by examiner

*Primary Examiner* — Joseph Chang
(74) *Attorney, Agent, or Firm* — Locke Lord LLP (57) ABSTRACT

Disclosed are an electromagnet driving mechanism, an electromagnet driving assembly and a dual power automatic transfer switch. The electromagnet driving mechanism includes: a mechanism frame; a stationary core; a movable core, including a moving stroke between a first position away from the stationary core and a second position in contact with the stationary core, the moving stroke including an approaching stroke section; a coil, configured to generate a magnetic attraction force between the stationary core and the movable core upon being energized to drive the movable core to move towards the second position; a reset spring member; and a reset auxiliary assembly, including a push member and a reset auxiliary spring. The reset auxiliary assembly applies a reset auxiliary spring force to the movable core in the approaching stroke section through the push member.

15 Claims, 6 Drawing Sheets

ELECTROMAGNET DRIVING MECHANISM, ASSEMBLY AND DUAL POWER AUTOMATIC TRANSFER SWITCH

TECHNICAL FIELD

The present disclosure relates to an electromagnet driving mechanism, an electromagnet driving mechanism assembly and a dual power automatic transfer switch including the electromagnet driving mechanism. More specifically, the present disclosure relates to an electromagnet driving mechanism with a reset auxiliary assembly, an electromagnet driving mechanism assembly including the electromagnet driving mechanism, and a dual power automatic transfer switch including the electromagnet driving mechanism assembly.

BACKGROUND

Dual power automatic transfer switch is widely used in emergency power supply system. The dual power automatic transfer switch can automatically switch a load circuit from one power supply to another power supply based on the status of the power supply circuit, such as switching between a commercial power supply and a standby power supply, so as to ensure the continuous power supply of the load circuit upon the commercial power supply being cut off.

For a three-station dual power automatic transfer switch, when the power is being switched, an electromagnet drive mechanism of the three-station dual power automatic transfer switch drives the movable contact to switch among a first power close position, a double separation position and a second power close position, thus realizing the power switch. At present, in many three-station dual power automatic transfer switches, the electromagnet drive mechanism needs to drive twice successively when the power supply is being switched. The first drive causes the movable contact switch from the first power supply close position to the double separation position, and the second drive causes the movable contact switch from the double separation position to the second power supply close position. The advantage of this driving mode is that the volume and power consumption of electromagnet are smaller than those of similar products.

Figure 1:
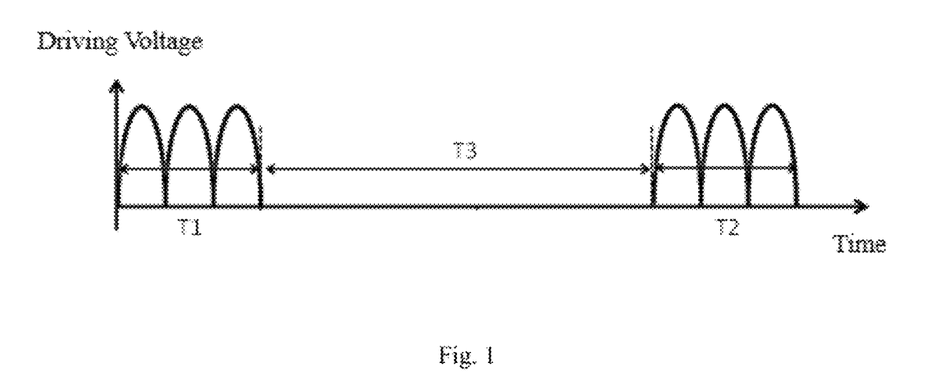
FIG. 1 shows a driving voltage signal diagram of a dual power automatic transfer switch.

FIG. 1 shows a driving voltage signal diagram of this driving mode. As shown in the figure, the duration of the first driving signal is T1, the duration of the second driving signal is T2, and there is a time interval T3 between the first driving signal and the second driving signal. After the first actuation, the movable core of the electromagnet drive mechanism needs to be reset to the initial position in time interval T3 to prepare for the second actuation.

However, due to various reasons, such as the residual electromagnetic force of the electromagnet drive mechanism after the first actuation, the movable core can't be quickly reset to the initial position, which can't meet the requirements of the dual power automatic transfer switch for transfer time.

Therefore, there is a need for an improved electromagnet driving mechanism and dual power automatic transfer switch, which can quickly reset the movable core to the initial position and meet the requirements of the transfer time for the dual power automatic transfer switch.

SUMMARY

The present disclosure aims at overcoming at least some of the above problems in the existing art.

An aspect according to the present disclosure provides an electromagnet driving mechanism, which includes:
a mechanism frame;
a stationary core, fixedly installed relative to the mechanism frame;
a movable core, being movable in a longitudinal direction relative to the stationary core and including a moving stroke between a first position away from the stationary core and a second position in contact with the stationary core, wherein the moving stroke includes an approaching stroke section;
a coil, coupled with the stationary core and/or the movable core, wherein the coil generates a magnetic attraction force between the stationary core and the movable core upon being energized to drive the movable core to move towards the second position;
a reset spring member, connected to the movable core and applying a reset spring force to the movable core during the moving stroke of the movable core; and
a reset auxiliary assembly, including a push member and a reset auxiliary spring connected with the push member, wherein the reset auxiliary assembly is configured to interact with the movable core in the approaching stroke section, so that the reset auxiliary spring applies a reset auxiliary spring force to the movable core in the approaching stroke section through the push member.

According to one or more embodiments of the present disclosure, the mechanism frame includes a bottom plate, the bottom plate includes a first surface facing the movable core and a second surface away from the movable core, and the stationary core is fixedly installed on the first surface of the bottom plate and includes a stationary core surface facing the movable core, the stationary core and the bottom plate include aligned holes, and the push member is configured to extend through the aligned holes of the stationary core and the bottom plate and beyond the stationary core surface of the stationary core.

According to one or more embodiments of the present disclosure, hole of the stationary core is a central hole of the stationary core.

According to one or more embodiments of the present disclosure, the reset auxiliary assembly further includes an assembly frame fixedly connected to the second surface of the mechanism frame, the assembly frame includes a bottom plate spaced apart from the bottom plate of the mechanism frame, and the reset auxiliary spring abuts against the bottom plate of the assembly frame for applying a spring force to the push member.

According to one or more embodiments of the present disclosure, the push member includes a first end portion and a rod portion connected with and extending from the first end portion, and the reset auxiliary spring surrounds the rod portion of the push member, and one end of the reset auxiliary spring abuts against the bottom plate of the assembly frame and the other end of the reset auxiliary spring abuts against the first end portion of the push member to apply a spring force to the first end portion of the push member.

According to one or more embodiments of the present disclosure, the push member further includes a second end portion connected with the rod portion, and the bottom plate of the assembly frame includes a through hole, the rod portion of the push member passes through the through hole.

According to one or more embodiments of the present disclosure, the push member includes a driving member and a bolt member, the driving member includes the first end portion and a driving rod connected with the first end portion, the bolt member includes the second end portion and a threaded rod portion connected with the second end portion, the driving rod of the driving member includes a threaded hole, and the threaded rod portion of the bolt member is screwed into the threaded hole of the driving rod of the driving member.

According to one or more embodiments of the present disclosure, the electromagnet driving mechanism further includes a movable core pull rod, connected to and moves with the movable core, and the reset spring member is connected to the movable core through the movable core pull rod.

According to one or more embodiments of the present disclosure, a length of the approaching stroke section is in a range from 1 mm to 5 mm.

According to one or more embodiments of the present disclosure, a distance between the movable core and the stationary core in the approaching stroke section is less than or equal to one tenth of a distance between the movable core and the stationary core in the first position.

According to one or more embodiments of the present disclosure, the stationary core, the movable core, the reset spring element, the push member, and the reset auxiliary spring are arranged in a straight line in the longitudinal direction.

According to one or more embodiments of the present disclosure, the movable core is columnar, and the mechanism frame includes an orientation hole matched with a shape of an outer periphery of the movable core, and the orientation hole surrounds the outer periphery of the movable core during the moving stroke of the movable core.

Another aspect according to the present disclosure provides an electromagnet driving mechanism assembly, which includes:
  a support structure, including one or more bifurcated portions; and
  one or more electromagnet driving mechanisms, wherein each of the one or more electromagnet driving mechanisms is connected to a corresponding one of the one or more bifurcated portions, at least one of the one or more electromagnet driving mechanisms is the above-mentioned electromagnet driving mechanism.

According to one or more embodiments of the present disclosure, the support structure includes two bifurcated portions and two electromagnet driving mechanisms.

Another aspect according to the present disclosure provides a dual power automatic transfer switch, which includes:
  the electromagnet driving mechanism assembly;
  a first stationary contact and a second stationary contact which are spaced apart;
  a movable contact, being movable among a first contact portion contacting the first stationary contact, a double-separation position not contacting the first stationary contact and the second stationary contact, and a second contact position contacting the second stationary contact; and
  a linkage mechanism, connected with the electromagnet driving mechanism assembly and the movable contact, wherein an actuating action of the electromagnet driving mechanism assembly drives the movable contact to move among the first contact position, the double-separation position and the second contact position through the linkage mechanism.

BRIEF DESCRIPTION OF THE DRAWINGS

FIGS. 2A and 2B show an electromagnet driving mechanism assembly according to one or more embodiments of the present disclosure, in which

FIGS. 3A-3D show a reset auxiliary assembly of an electromagnet driving mechanism assembly according to one or more embodiments of the present disclosure, in which

DETAILED DESCRIPTION

The embodiments of the present disclosure will be described in detail below, examples of the embodiments are shown in the attached drawings, in which the same or similar reference numerals indicate the same or similar elements or elements with the same or similar functions. The embodiments described below with reference to the drawings are exemplary, and are only used to explain the present disclosure, but not to limit the present disclosure.

Unless otherwise defined, the technical terms or scientific terms used here shall have the ordinary meanings understood by an ordinary skilled person in the art. In the description of the present disclosure, it should be understood that the indicated orientation or positional relationship indicated by the terms "center", "longitudinal", "lateral", "upper", "lower", "front", "rear", "left", "right", "vertical", "horizontal", "top", "bottom", "inside" and the like is based on the orientation or positional relationship shown in the attached figure, which is only for convenience and simplification of the description of the present disclosure, and does not indicate or imply that the referred device or element must have a specific orientation, be constructed and operated in a specific orientation, so it cannot be understood as a restriction to the present disclosure. In addition, the terms "first" and "second" are only used for descriptive purposes and cannot be understood as indicating or implying a relative importance.

The present disclosure provides an electromagnet driving mechanism, which includes a reset auxiliary assembly, the reset auxiliary assembly interacts with a movable core only in an approaching stroke section where the movable core and a stationary core of the electromagnet driving mechanism are very close, so that a reset auxiliary spring applies a reset auxiliary spring force on the movable core in the approaching stroke section. The reset auxiliary spring force can provide an initial reset speed for the movable core, thus contributing to the quick reset of the movable core. Because the length of the approaching stroke section of the movable core is far less than the whole moving stroke of the movable core, the existence of the reset auxiliary assembly will not affect the normal work of the electromagnet driving mechanism. In addition, the reset auxiliary assembly can also provide a cushion effect for the movable core.

Figure 2A:
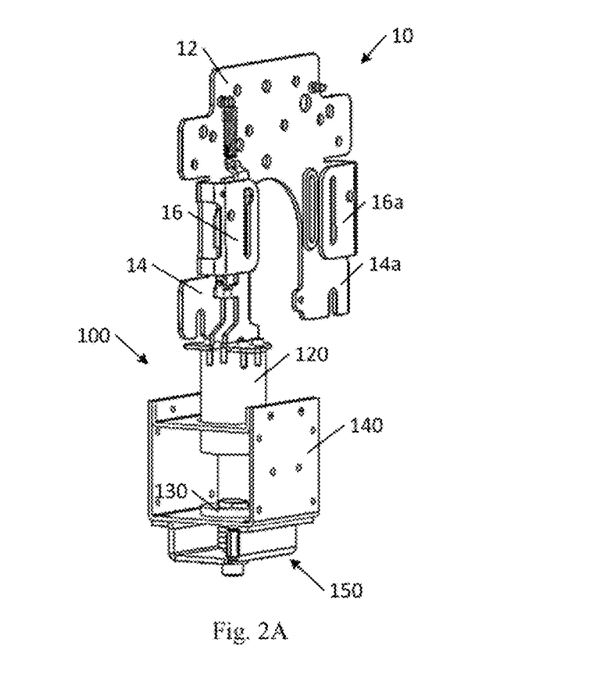
FIG. 2A is a perspective view of the electromagnet driving mechanism assembly.
Figure 2B:
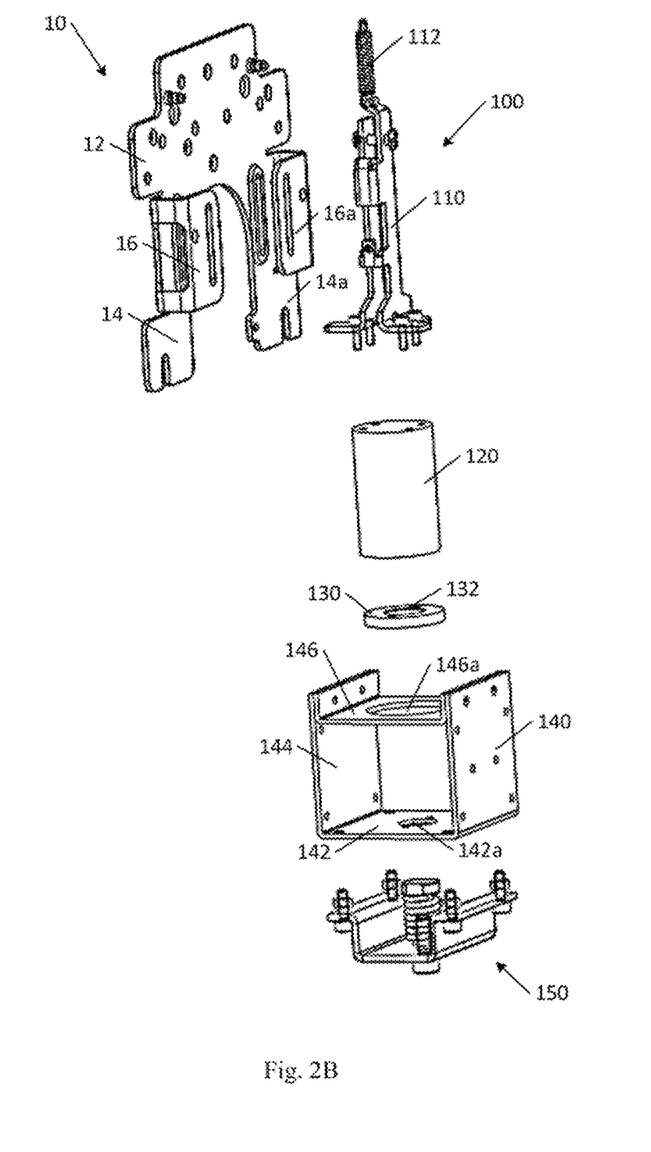
FIG. 2B is an exploded view of the electromagnet driving mechanism assembly.

FIGS. 2A and 2B show an electromagnet driving mechanism assembly 10 according to one or more embodiments of the present disclosure, in which FIG. 2A is a perspective view of the electromagnet driving mechanism assembly 10 and FIG. 2B is an exploded view of the electromagnet driving mechanism assembly 10. As shown in the figures, the electromagnet driving mechanism assembly 10 includes a support structure 12, and the support structure 12 includes two bifurcated portions 14 and 14a. The electromagnet driving mechanism assembly 10 further includes two electromagnet driving mechanisms, each of which is connected to a corresponding one of the bifurcated portions 14, 14a. For the sake of clarity, only one electromagnet driving mechanism 100 connected to the bifurcated portion 14 is shown.

The electromagnet driving mechanism 100 includes a movable core pull rod 110, a movable core 120, a stationary core 130, a coil (not shown), a mechanism frame 140, and a reset auxiliary assembly 150. The mechanism frame 140 includes a bottom plate 142, two side plates 144 extending upward from the bottom plate 142, and a reinforcing plate 146 extending between the two side plates 144. The bottom plate 142 includes a first surface facing upward and a second surface facing downward. The stationary core 130 is fixedly installed to the first surface of the bottom plate 142 of the mechanism frame 140. The bottom plate 142 is provided with a hole 142a, the stationary core 130 includes a central hole 132, and the hole 142a of the bottom plate 142 is aligned with the central hole 132 of the stationary core 130. The reset auxiliary assembly 150 is fixedly connected to the second surface of the bottom plate 142. The reset auxiliary assembly 150 comprises a push member that passes through the aligned holes 132, 142a of the stationary core 130 and the bottom plate 142 from the underside of the bottom plate 142 and extends beyond the upper surface of the stationary core 130.

The movable core 120 is movable relative to the stationary core 130 in a longitudinal direction (herein, the direction of up and down movement of the movable core 120 is defined as the longitudinal direction). The electromagnet driving mechanism 100 comprises a coil (not shown) that is coupled with the movable core 120 and the stationary core 130, so that, upon the coil being energized, a magnetic attraction force is generated between the stationary core 130 and the movable core 120. The magnetic attraction force drives the movable core 120 to move toward the stationary core 130.

The movable core pull rod 110 is connected to the movable core 120 and can move with the movable core 120 relative to the stationary core 130. One end of the reset spring member 112 is connected to the bifurcated portion 14 of the support structure 12, and the other end of the reset spring member 112 is connected to the movable core pull rod 110 to pull the movable core pull rod 110 and the movable core 120 upward.

The bifurcated portions 14, 14a of the support structure 12 each include an orientation portion 16, 16a. Upon the movable core pull rod 110 and the movable core 120 moving together, the movable core pull rod 110 moves at least partially in the orientation portions 16, 16a. The reinforcing plate 146 includes an orientation hole 146a. The orientation hole 146a has a shape and size matched with the outer circumference of the cylindrical movable core 120. Upon the movable core pull rod 110 and the movable core 120 moving together, the orientation hole 146a of the reinforcing plate 146 surrounds the movable core 120. The orientation portion 16 and the orientation hole 146a together ensure that the movable core pull rod 110 and the movable core 120 will not deviate from their correct orientation aligned with the stationary core 130 during their movement. As shown in FIGS. 4A-4F, during the movement of the movable core 120, the stationary core 130, the movable core 120, the reset spring member 112, the push member 162 and the reset auxiliary spring 154 are arranged in a straight line in the longitudinal direction.

Figure 3A:
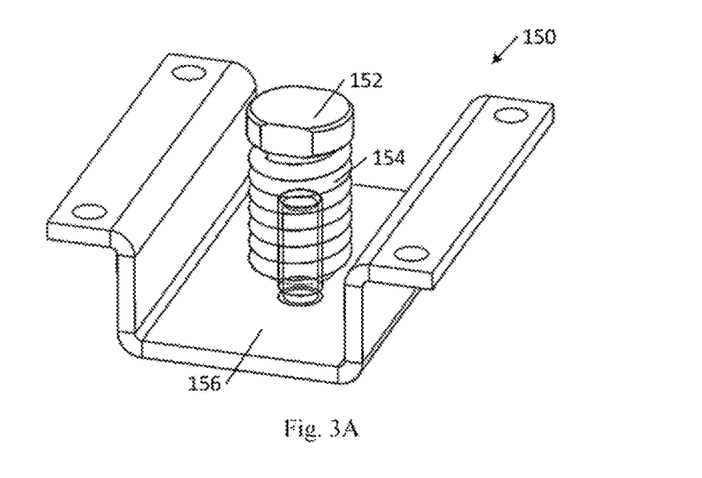
FIGS. 3A and 3B are perspective views of the reset auxiliary assembly.
Figure 3B:
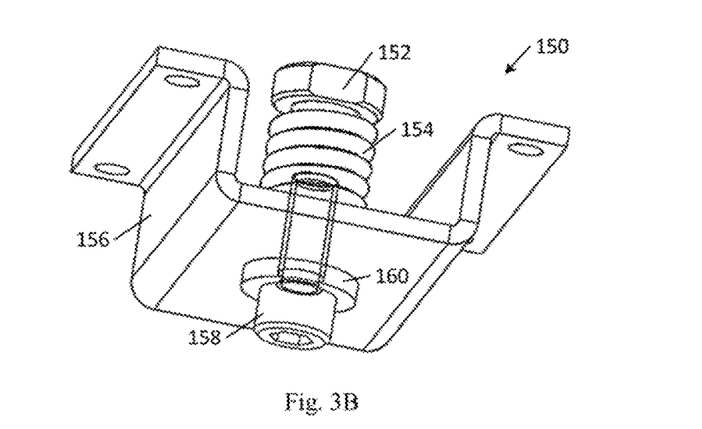
Figure 3C:
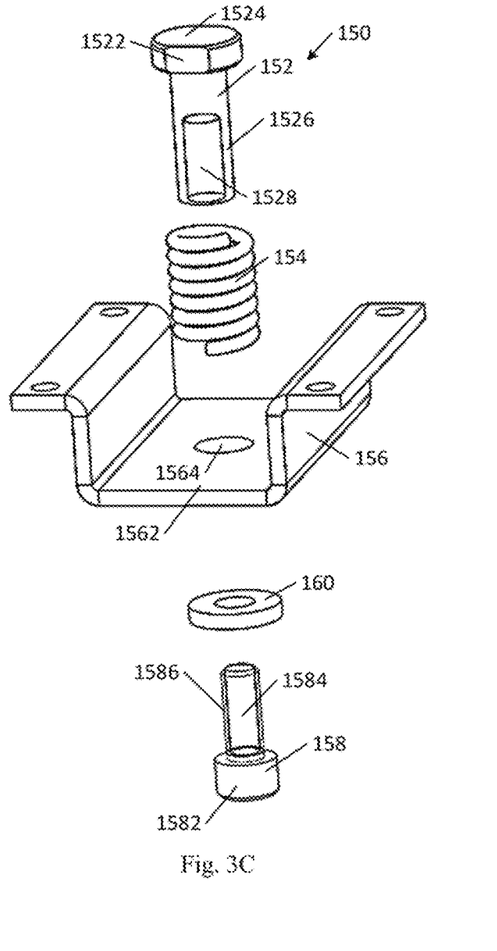
FIG. 3C is an exploded view.
Figure 3D:
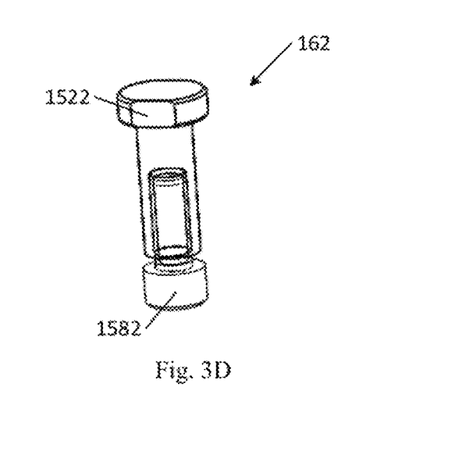
FIG. 3D is a view of a push member of the reset auxiliary assembly 150.

FIGS. 3A-3C show a reset auxiliary assembly 150 of the electromagnet driving mechanism assembly 10 according to one or more embodiments of the present disclosure, in which FIGS. 3A and 3B are perspective views of the reset auxiliary assembly 150, and FIG. 3C is an exploded view. FIG. 3D is a view of a push member 162 of the reset auxiliary assembly 150. The reset auxiliary assembly 150 includes an assembly frame 156 including a bottom plate 1562 and a hole 1564 provided in the bottom plate 1562. The reset auxiliary assembly 150 further includes a push member 162, a reset auxiliary spring 154 and a support ring 160. The push member 162 is formed by fastening a driving member 152 and a bolt member 158 by threads. The driving member 152 includes a driving end portion 1522 and a driving rod 1526; the driving end portion 1522 includes a driving surface 1524 and the driving rod 1526 is formed with a threaded hole 1528. The bolt member 158 includes a limitation end portion 1582 and a rod portion 1584, and the rod portion 1584 includes an external thread 1586. The rod portion 1584 of the bolt member 158 is screwed into the threaded hole 1528 of the driving rod 1526 of the driving member 152, thereby forming the push member 162. As shown in FIG. 4D, the push member 162 includes a driving end portion 1522 and a limitation end portion 1582 (also called a first end portion and a second end portion) at both ends thereof, and a rod portion extending between the driving end portion 1522 and the limitation end portion 1582.

As shown in FIGS. 3A and 3B, in the reset auxiliary assembly 150, the rod portion of the push member 162 extends through the hole 1564 in the bottom plate 1562 of the assembly frame 156, the driving end portion 1522 of the push member 162 is on the upper side of the bottom plate 1562 of the assembly frame 156, and the limitation end portion 1582 and the supporting ring 160 are on the lower side of the bottom plate 1562. A reset auxiliary spring 154 is between the driving end portion 1522 of the push member 162 and the bottom plate 1562 of the assembly frame 156 and surrounds the rod portion of the push member 162. One end of the reset spring 154 abuts against the bottom plate 1562 of the assembly frame 156, and the other end of the reset spring 154 abuts against the driving end portion 1522 to apply a spring force to the push member 152, so that the limitation end portion 1582 and the support ring 160 of the push member 162 abut against the lower surface of the bottom plate 1562 of the assembly frame 156, thereby defining a longitudinal position of the driving end portion 1522 and the driving surface 1524 relative to the bottom plate 1562 of the assembly frame 156.

The reset auxiliary assembly 150 may be installed to the second surface of the bottom plate 142 of the mechanism frame 140 by fasteners. Upon the reset auxiliary assembly 150 being installed to the mechanism frame 140, the bottom plate 1562 of the assembly frame 156 is spaced apart from the second surface of the bottom plate 142 of the mechanism frame 140. The driving end portion 1522 of the push member 162 of the reset auxiliary assembly 150 passes through the aligned holes 132, 142A of the stationary core 130 and the bottom plate 142 and extends beyond the upper surface of the stationary core 130, as shown in FIGS. 2A and 4A.

Figure 4A:
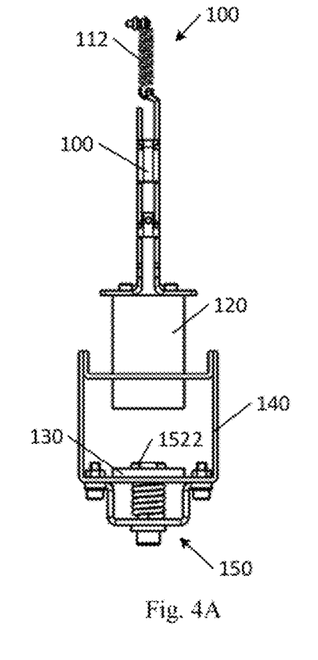
FIGS. 4A-4F show an actuation process of the electromagnet driving mechanism according to the present disclosure.
Figure 4B:
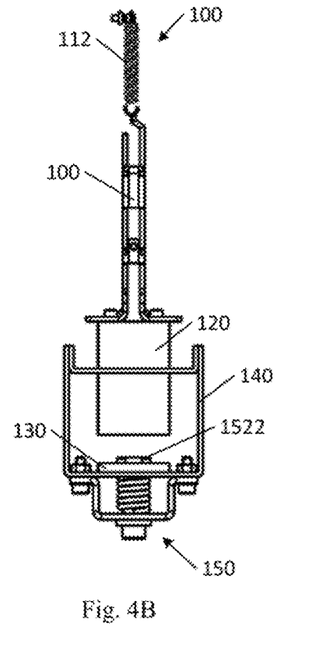
Figure 4C:
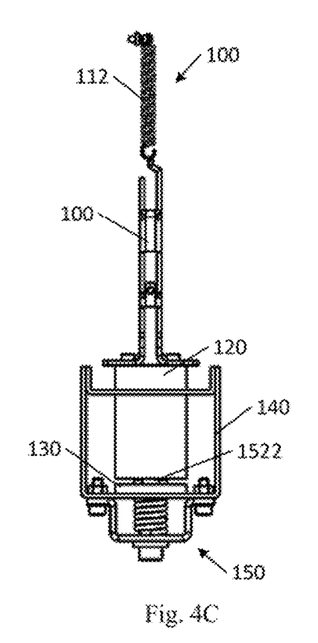
Figure 4D:
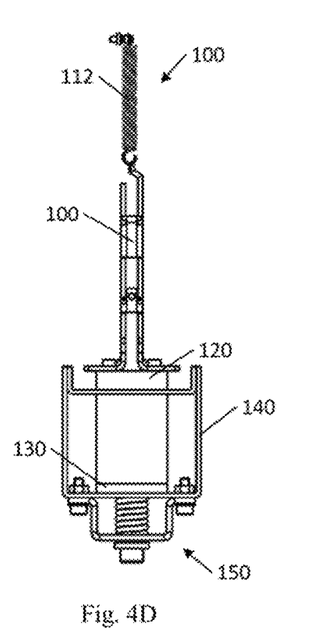
Figure 4E:
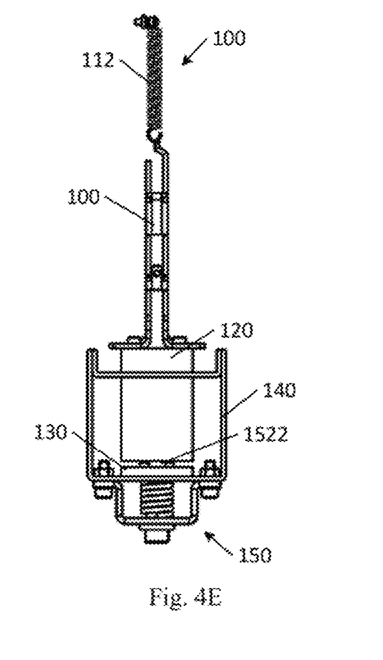

FIGS. 4A-4E show an actuation process of the electromagnet driving mechanism 100 according to the present disclosure. FIG. 4A shows an initial position or state upon the electromagnet driving mechanism 100 being not actuated, in which the movable core 120 is in an initial position (also referred to as a first position) away from the stationary core 130. At some time point thereafter, the electromagnet driving mechanism 100 is actuated, and its coil (not shown) is energized. In one or more embodiments, the driving voltage supplied to the coil may be the driving voltage as shown in FIG. 1, and includes two voltage driving signals, the duration of the first voltage driving signal is T1, the duration of the second voltage driving signal is T2, and there is a time interval T3 between the first voltage driving signal and the second voltage driving signal.

The movable core 120 and/or the stationary core 130 are coupled with the coil, so that an electromagnetic attraction force is generated between the movable core 120 and the stationary core 130 upon the coil being energized. The movable core 120 moves toward the stationary core 130 against the tension of the reset spring 112 under the action of the electromagnetic attraction force. According to one or more embodiments of the present disclosure, the driving voltage signal supplied to the coil ends at some time point in the process of moving the movable core 120 toward the stationary core 130, for example, at some time point when the movable core 120 moves to a position relatively close to the stationary core 130. Upon the coil having a driving voltage signal, that is, upon the coil being energized, the movable core 120 moves toward the stationary core 130 against the tension of the reset spring 112 under the action of the electromagnetic attraction force between the movable core 120 and the stationary core 130. After the driving voltage signal supplied to the coil is finished, that is, upon the coil being not energized, the movable core 120 can continue to move toward the stationary core 130 under the action of the residual electromagnetic attraction force between the movable core 120 and the stationary core 130 and/or due to inertia.

FIG. 4B shows a position or state of the movable core 120 in the process of moving to the stationary core 130. After reaching the position shown in FIG. 4B, the movable core 120 continues to move toward the stationary core 130, to the position shown in FIG. 4C where the movable core 120 just contacts the driving end portion 1522 of the reset auxiliary assembly 150. After that, the movable core 120 continues to move toward the stationary core 130, to the position where the movable core 120 contacts the stationary core 130 as shown in FIG. 4D. During the movement of the movable core 120 from the position shown in FIG. 4C to the position shown in FIG. 4D, the driving end portion 1522 of the reset auxiliary assembly 150 is pressed by the movable core 120, and the reset auxiliary spring 154 is compressed. In this process, the reset auxiliary spring 154 of the reset auxiliary assembly 150 applies an upward force to the movable core 120 through the driving end portion 152.

Then, under the upward force applied by the reset spring 112 and the reset auxiliary spring 154, the movable core 120 moves away from the stationary core 130 in the upward direction and is out of contact with the stationary core 130. After the movable core 120 reaches the position shown in FIG. 4E, the movable core 120 comes out of contact with the driving end portion 1522 of the reset auxiliary assembly 150. After that, the driving end portion 152 of the reset auxiliary assembly 150 no longer applies the upward force to the movable core 120, and the movable core 120 resets to the position shown in FIG. 4F under the action of the reset spring member 112. After the movable core 120 resets to the position shown in FIG. 4F, the electromagnet driving mechanism 100 perform a second drive, for example, by the second voltage driving signal shown in FIG. 1.

During the whole moving stroke of the movable core 120, the reset spring member 112 always applies an upward spring force to the movable core 120. While the reset auxiliary spring 154 applies an upward spring force to the movable core 120 only in a short stroke section between the position shown in FIG. 4C and the position shown in FIG. 4E. Specifically, during the movement of the movable core 120 from the position shown in FIG. 4C to the position shown in FIG. 4D, the spring force applied by the reset auxiliary spring 154 can reduce the moving speed of the movable core 120 towards the stationary core 130, and reduce the impact force on the stationary core 130 when the movable core 120 contacts with the stationary core 130, thus providing a cushion effect. In the process of moving the movable core 120 from the position shown in FIG. 4D to the position shown in FIG. 4E, that is, at the beginning of the reset stroke of the movable core 120 from the contact position with the stationary core 130 to its initial position, the spring force of the reset auxiliary spring 154 can provide the initial speed to the movable core 120, thus accelerating the reset process of the movable core 120.

Figure 4F:
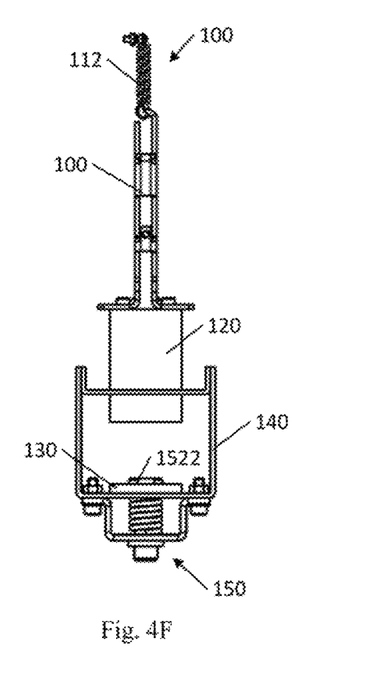

Herein, the moving stroke of the movable core 120 refers to a stroke from the initial position shown in FIG. 4A to the contact position with the stationary core shown in FIG. 4D, and from the contact position shown in FIG. 4D to the initial position shown in FIG. 4F. A stroke of the movable core 120 from the position shown in FIG. 4C (the position where the movable core 120 just contacts the driving end portion 1522 of the reset auxiliary assembly 150) to the position shown in FIG. 4D (the position where the movable core 120 contacts the stationary core 130), and from the position shown in FIG. 4D to the position shown in FIG. 4E can be referred to as a approaching stroke section. That is, the approaching stroke section is a stroke section in which the movable core 120 approaches the stationary core 130 and the reset auxiliary assembly 150 interacts with the movable core 120 in the moving stroke of the movable core 120. The length of the approaching stroke section is equal to a distance that the push member of the reset auxiliary assembly 150 extends beyond the upper surface of the stationary core 130 in the initial position shown in FIG. 4A. In the approaching stroke section of the movable core, the reset spring 112 and the reset auxiliary spring 154 jointly apply an upward spring force to the movable core 120. On the other hand, only the reset spring member 112 applies an upward spring force to the movable core 120 during the moving stroke except the approaching stroke. Herein, the reset spring member 112 applies an upward spring force to the movable core 120 toward the initial position (also called the first position) of the movable core 120, which can reset the movable core 120 to the initial position, so it is also called reset spring force. The upward spring force applied by the reset auxiliary spring 154 to the movable core 120 also faces the initial position of the movable core 120, which helps to reset the movable core 120 to the initial position, so it is also called the reset auxiliary spring force.

According to one or more embodiments of the present disclosure, the length of the approaching stroke section of the movable core may be less than 1/5 of the moving stroke of the movable core. In other embodiments, the length of the approaching stroke section of the movable core may be less than 1/10 of the moving stroke of the movable core. In other embodiments, the length of the approaching stroke section of the movable core may be less than 1/20 of the moving stroke of the movable core. According to another embodiment or embodiments of the present disclosure, the length of the approaching stroke section of the movable core may be in the range from 1 mm to 5 mm. In other embodiments, the length of the movable core near the stroke section may be about 2 mm. Because the length of the approaching stroke section of the movable core is much shorter than the moving stroke of the movable core, the reset auxiliary assembly 150 will not affect the normal operation of the electromagnet driving mechanism 100. The elastic coefficient of the reset spring 154 may be much larger than that of the reset spring 112. In some embodiments, the elastic coefficient of the reset auxiliary spring 154 may be 5 times greater than that of the reset spring member 112. In other embodiments, the elastic coefficient of the reset auxiliary spring 154 may be 10 times greater than that of the reset spring member 112. In other embodiments, the elastic coefficient of the reset auxiliary spring 154 may be 20 times greater than that of the reset spring member 112. In some embodiments, the reset auxiliary spring 154 is preloaded, that is, the reset auxiliary spring 154 is already in a compressed state before the pressure of the passive core 120 compresses.

The inventor(s) of the present disclosure also conducted experiments to test the technical effect of the present disclosure. The experiment was conducted through an experimental example and a comparative example. The experimental example basically has the structure shown in FIG. 2A. The comparative example also has a basically similar structure, except that the comparative example does not include the reset auxiliary assembly 150 shown in the figure. According to the test results, the electromagnet driving mechanism of the present disclosure can significantly reduce the reset time of the movable core. Compared with the comparative example, the movable core reset time of the experimental example of the present disclosure is shortened by more than 50%.

Figure 5:
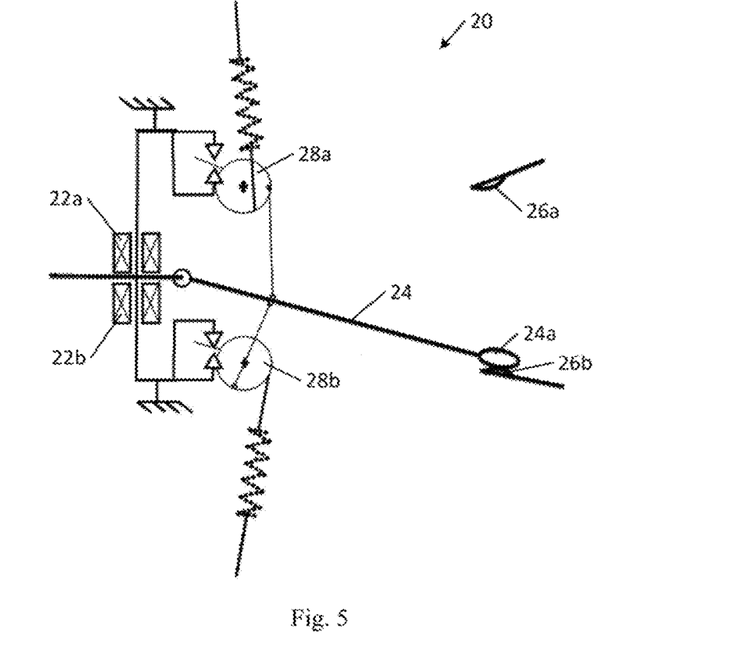
FIG. 5 shows a schematic diagram of a dual power automatic transfer switch according to one or more embodiments of the present disclosure.

FIG. 5 shows a schematic diagram of a dual power automatic transfer switch 20. The dual power automatic transfer switch 20 includes a first electromagnet driving mechanism 22a, a second electromagnet driving mechanism 22b, a first linkage mechanism including a first spindle 28a, a second linkage mechanism including a second spindle 28b, a movable contact bracket 24 and a movable contact 24a, a first stationary contact 26a and a second stationary contact 26b. When the load circuit needs to be switched from one power supply to another, a driving voltage, such as the driving voltage shown in FIG. 1, is supplied to the first electromagnet driving mechanism 22a or the second electromagnet driving mechanism 22b, so that the first electromagnet driving mechanism 22a or the second electromagnet driving mechanism 22b is actuated twice, thereby driving the movable contact 24a to move from a position of contacting one of the first stationary contact 26a and the second stationary contact 26b to a double-separation position, and then moving to the other of the first stationary contact 26a and the second stationary contact 26b. For example, when it is needed to drive the movable contact 24a to move from a contact position with the first stationary contact 26a to a contact position with the second stationary contact 26b to switch the power supply, the second electromagnet driving mechanism 22b is actuated for the first time, and the movable contact bracket 24 is moved by the second linkage mechanism including the second spindle 28b, so that the movable contact 24a moves from the contact position with the first stationary contact 26a to the double-separation position. After the second electromagnet driving mechanism 22b is reset, the second electromagnet driving mechanism 22b is actuated for the second time, so that the movable contact 24a moves from the double-separation position to a contact position with the second stationary contact 26b, thereby realizing the switch from one power supply to another. For example, when it is needed to drive the movable contact 24a to move from the contact position with the second stationary contact 26b to the contact position with the first stationary contact 26a to switch the power supply, the first electromagnet driving mechanism 22a is actuated for the first time to drive the movable contact bracket 24 through the first linkage mechanism including the first spindle 28a, so that the movable contact 24a moves from the contact position with the second stationary contact 26b to the double-separation position. After the first electromagnet driving mechanism 22a is reset, the first electromagnet driving mechanism 22a is actuated for the second time, so that the movable contact 24a moves from the double-separation position to the contact position with the first stationary contact 26a, thereby realizing the switch from one power supply to another.

According to one or more embodiments of the present disclosure, the first electromagnet driving mechanism and the second electromagnet driving mechanism of the dual power automatic transfer switch 20 may be electromagnet driving mechanisms as shown in FIGS. 2A-2B and 4A-4E. According to one or more embodiments of the present disclosure, the first electromagnet driving mechanism and the second electromagnet driving mechanism of the dual power automatic transfer switch 20 may constitute the electromagnet driving mechanism assembly shown in FIGS. 2A-2B. The structure of the dual power automatic transfer switch 20 shown in FIG. 5 is exemplary. In some embodiments of the present disclosure, the dual power automatic transfer switch can include any suitable structure, as long as it switches the movable contact from one stationary contact to another by two actuations of the electromagnet driving mechanism.

In the embodiment shown in FIGS. 2A-2B, the support structure of the electromagnet driving mechanism assembly includes two bifurcated portions and two electromagnet driving mechanisms, and each of the electromagnet driving mechanisms is connected to a corresponding one of the bifurcated portions. According to other embodiments of the present disclosure, the support structure of the electromagnet driving mechanism assembly includes one or more than two bifurcated portions and a corresponding number of electromagnet driving mechanisms, and each of the electromagnet driving mechanisms is connected to a corresponding one of the bifurcated portions.

In the embodiment shown in FIGS. 3A-3D, the push member 162 includes a driving member 152 and a bolt member 158 which are screwed together. In some other embodiments, the push member of the reset auxiliary assembly may have other suitable structures, as long as it can apply the spring force of the reset auxiliary spring 154 to the movable core in the approaching stroke section. In some other embodiments, the reset auxiliary assembly may not include the support ring 160, and in this case, the size of the limitation end portion of the push member 162 needs to be larger than the hole 1564 on the bottom plate 1562 of the assembly frame 156.

The above-mentioned exemplary embodiments are only used to explain the principle of the present disclosure and are not used to limit the protection scope of the present disclosure. For ordinary technical skilled in this art, various modifications and improvements can be made without departing from the spirit and essence of the present disclosure, and these modifications and improvements are also within the protection scope of the present disclosure.

The invention claimed is:

1. An electromagnet driving mechanism, characterized by comprising:
    a mechanism frame;
    a stationary core, fixedly installed relative to the mechanism frame;
    a movable core, being movable in a longitudinal direction relative to the stationary core and comprising a moving stroke between a first position away from the stationary core and a second position in contact with the stationary core, wherein the moving stroke comprises an approaching stroke section;
    a coil, coupled with the stationary core and/or the movable core, wherein the coil generates a magnetic attraction force between the stationary core and the movable core upon being energized to drive the movable core to move towards the second position;
    a reset spring member, connected to the movable core and applying a reset spring force to the movable core during the moving stroke of the movable core; and
    a reset auxiliary assembly, comprising a push member and a reset auxiliary spring connected with the push member, wherein the reset auxiliary assembly is configured to interact with the movable core in the approaching stroke section, so that the reset auxiliary spring applies a reset auxiliary spring force to the movable core in the approaching stroke section through the push member.

2. The electromagnet driving mechanism according to claim 1, characterized in that the mechanism frame comprises a bottom plate, the bottom plate comprises a first surface facing the movable core and a second surface away from the movable core, and the stationary core is fixedly installed on the first surface of the bottom plate and comprises a stationary core surface facing the movable core, the stationary core and the bottom plate comprise aligned holes, and the push member is configured to extend through the aligned holes of the stationary core and the bottom plate and beyond the stationary core surface of the stationary core.

3. The electromagnet driving mechanism according to claim 2, characterized in that hole of the stationary core is a central hole of the stationary core.

4. The electromagnet driving mechanism according to claim 2, characterized in that the reset auxiliary assembly further comprises an assembly frame fixedly connected to the second surface of the mechanism frame, the assembly frame comprises a bottom plate spaced apart from the bottom plate of the mechanism frame, and the reset auxiliary spring abuts against the bottom plate of the assembly frame for applying a spring force to the push member.

5. The electromagnet driving mechanism according to claim 4, characterized in that the push member comprises a first end portion and a rod portion connected with and extending from the first end portion, and the reset auxiliary spring surrounds the rod portion of the push member, and one end of the reset auxiliary spring abuts against the bottom plate of the assembly frame and the other end of the reset auxiliary spring abuts against the first end portion of the push member to apply a spring force to the first end portion of the push member.

6. The electromagnet driving mechanism according to claim 5, characterized in that the push member further comprises a second end portion connected with the rod portion, and the bottom plate of the assembly frame comprises a through hole, the rod portion of the push member passes through the through hole.

7. The electromagnet driving mechanism according to claim 6, characterized in that the push member comprises a driving member and a bolt member, the driving member comprises the first end portion and a driving rod connected with the first end portion, the bolt member comprises the second end portion and a threaded rod portion connected with the second end portion, the driving rod of the driving member comprises a threaded hole, and the threaded rod portion of the bolt member is screwed into the threaded hole of the driving rod of the driving member.

8. The electromagnet driving mechanism according to claim 1, characterized by further comprising a movable core pull rod, connected to and moves with the movable core, and the reset spring member is connected to the movable core through the movable core pull rod.

9. The electromagnet driving mechanism according to claim 1, characterized in that a length of the approaching stroke section is in a range from 1 mm to 5 mm.

10. The electromagnet driving mechanism according to claim 1, characterized in that a distance between the movable core and the stationary core in the approaching stroke section is less than or equal to one tenth of a distance between the movable core and the stationary core in the first position.

11. The electromagnet driving mechanism according to claim 1, characterized in that the stationary core, the movable core, the reset spring element, the push member, and the reset auxiliary spring are arranged in a straight line in the longitudinal direction.

12. The electromagnet driving mechanism according to claim 1, characterized in that the movable core is columnar, and the mechanism frame comprises an orientation hole matched with a shape of an outer periphery of the movable core, and the orientation hole surrounds the outer periphery of the movable core during the moving stroke of the movable core.

13. An electromagnet driving mechanism assembly, characterized by comprising:
    a support structure, comprising one or more bifurcated portions; and
    one or more electromagnet driving mechanisms, wherein each of the one or more electromagnet driving mechanisms is connected to a corresponding one of the one or more bifurcated portions, at least one of the one or more electromagnet driving mechanisms is the electromagnet driving mechanism according to claim 1.

14. The electromagnet driving mechanism assembly according to claim 13, characterized in that the support structure comprises two bifurcated portions and two electromagnet driving mechanisms.

15. A dual power automatic transfer switch, characterized by comprising:
    the electromagnet driving mechanism assembly according to claim 13;
    a first stationary contact and a second stationary contact which are spaced apart;
    a movable contact, being movable among a first contact portion contacting the first stationary contact, a double-separation position not contacting the first stationary contact and the second stationary contact, and a second contact position contacting the second stationary contact; and
    a linkage mechanism, connected with the electromagnet driving mechanism assembly and the movable contact, wherein an actuating action of the electromagnet driving mechanism assembly drives the movable contact to move among the first contact position, the double-separation position and the second contact position through the linkage mechanism.

\* \* \* \* \*